(12) United States Patent
Yunoki et al.

(10) Patent No.: US 12,535,798 B2
(45) Date of Patent: Jan. 27, 2026

(54) COMMUNICATION RESOURCE OPTIMIZATION SYSTEM LEVERAGING PRODUCTION PLANNING INFORMATION

(71) Applicant: HITACHI, Ltd., Tokyo (JP)

(72) Inventors: Shoji Yunoki, Santa Clara, CA (US);
Daisuke Ishii, Santa Clara, CA (US);
Taisuke Ueta, San Jose, CA (US)

(73) Assignee: HITACHI, LTD., Tokyo (JP)

( * ) Notice: Subject to any disclaimer, the term of this patent is extended or adjusted under 35 U.S.C. 154(b) by 364 days.

(21) Appl. No.: 18/199,491

(22) Filed: May 19, 2023

(65) Prior Publication Data

US 2024/0385599 A1   Nov. 21, 2024

(51) Int. Cl.
*G05B 19/418* (2006.01)

(52) U.S. Cl.
CPC ............ *G05B 19/41835* (2013.01); *G05B 2219/32361* (2013.01)

(58) Field of Classification Search
CPC .. G05B 13/02; G05B 13/0205; G05B 13/021; G05B 13/024; G05B 19/41835; G05B 2219/32261

See application file for complete search history.

(56) References Cited

U.S. PATENT DOCUMENTS

| | | | |
|---|---|---|---|
| 10,185,307 B2 * | 1/2019 | Olmino | G05B 19/41865 |
| 10,649,414 B2 * | 5/2020 | Sangi | F01K 13/02 |
| 11,245,767 B1 | 2/2022 | Yunoki | |
| 11,340,562 B2 * | 5/2022 | Liu | G05B 19/41885 |
| 11,418,430 B2 * | 8/2022 | Yunoki | H04L 45/121 |
| 11,483,247 B2 * | 10/2022 | Hadavi | H04L 47/2408 |
| 11,619,928 B1 * | 4/2023 | Shao | H04L 67/12 700/28 |
| 2019/0346834 A1 * | 11/2019 | Saunders, Jr. | G05B 13/021 |
| 2022/0171371 A1 * | 6/2022 | Wang | G05B 19/41845 |
| 2023/0161303 A1 * | 5/2023 | Xia | H04L 69/18 700/28 |

* cited by examiner

*Primary Examiner* — Thomas K Pham
(74) *Attorney, Agent, or Firm* — PROCOPIO, CORY, HARGREAVES & SAVITCH LLP (57) ABSTRACT

A method for optimizing communication resource. The method may include substituting, by a processor, previous production line states associated with at least one production line to a default null state; and performing iteratively, by the processor: accessing production line information to obtain current production line state associated with the at least one production line; for each of the at least one production line: determining if previous production line state matches current production line state, for previous production line state not matching current production line state: accessing device information to retrieve IP address list of devices associated with production line, accessing quality of service (QOS) association information to retrieve QoS level for each of the devices, and creating pairings of IP address and QoS level in QoS configuration information for each device of the devices based on the IP address list and the QoS association information.

9 Claims, 8 Drawing Sheets

FIG. 1

| Production Line ID | Time | Production line state |
|---|---|---|
| 1 | 00:00-08:00 | Idle |
| 1 | 08:00-18:00 | Production |
| 1 | 18:00-24:00 | Stop |
| 2 | 00:00-08:00 | Production |
| 2 | 08:00-12:00 | Idle |
| 2 | 12:00-24:00 | Maintenance |

FIG. 2

| Production line state | QoS level |
|---|---|
| Stop | 1 |
| Idle | 2 |
| Inspection | 3 |
| Maintenance | 4 |
| Production | 5 |

FIG. 3

| QoS level | Delay |
|---|---|
| 1 | 200[ms] |
| 2 | 100[ms] |
| 3 | 50[ms] |
| 4 | 10[ms] |
| 5 | 5[ms] |
| 6 | 1[ms] |

FIG. 4

| Production Line ID | Device ID | IP address |
|---|---|---|
| 1 | 1 | 192.168.1.1 |
| | 2 | 192.168.1.2 |
| | 3 | 192.168.1.3 |
| 2 | 4 | 192.168.2.1 |
| | 5 | 192.168.2.2 |
| | 6 | 192.168.2.3 |

| Production Line ID | Production line state | Device ID | IP address |
|---|---|---|---|
| 1 | Production | 1 | 192.168.1.1 |
| | | 2 | 192.168.1.2 |
| | | 3 | 192.168.1.3 |
| 2 | Production | 4 | 192.168.2.1 |
| | | 5 | 192.168.2.2 |
| | | 6 | 192.168.2.3 |

| Production Line ID | Time | Production line state | Production progress |
|---|---|---|---|
| 1 | 00:00-08:00 | Idle | |
| 1 | 08:00-18:00 | Production | delayed |
| 1 | 18:00-24:00 | Stop | |
| 2 | 00:00-08:00 | Production | |
| 2 | 08:00-12:00 | Idle | N/A |
| 2 | 12:00-24:00 | Maintenance | |

COMMUNICATION RESOURCE OPTIMIZATION SYSTEM LEVERAGING PRODUCTION PLANNING INFORMATION

BACKGROUND

Field

The present disclosure is generally directed to a method and a system for communication resource optimization.

Related Art

Manufacturing industry has been transitioning from mass production to low-volume high-variety production which requires flexibility in manufacturing lines. To achieve flexibility, wireless communication networks are required for manufacturing processes so that field devices can be easily rearranged to produce different products. Communication networks applied to manufacturing processes are required to guarantee certain communication quality such as guaranteed latency, guaranteed rate, etc. Fifth-generation mobile network (5G) is a communication system which can provide both wireless and guaranteed communication. However, the guaranteed communication resource a 5G system can provide is limited. When 5G is applied to manufacturing system as it is, guaranteed communication resources could be allocated to manufacturing processes even when they are idle. Optimized quality of service (QOS) resource allocation is therefore necessary to maximize the number of manufacturing processes a 5G system can accommodate.

In the related art, a network management server performs QoS communication resource allocation to each field device based on current state of application running on the device. Utilization of the network management server leads to frequent changes in the states of manufacturing applications. For example, when a defect in manufactured product is detected, the state of the relevant manufacturing application can transition from "running" to "stop" or "maintenance" while the manufacturing line is supposed to be in the production state, which allows an operator to inspect the production line. Frequent change of QoS allocation can lead to degradation of manufacturing application performance as short-term interruptions in communication can occur.

SUMMARY

Example implementations use a network orchestrator that utilizes a stable long-term production plan stored in a Manufacturing Execution System (MES) instead of field devices' application states, which can fluctuate when QoS resource allocation is configured to the field devices. The production plan may include information such as scheduled operation modes of manufacturing lines at different time periods. The QoS orchestrator stores an association between operation modes of manufacturing lines and corresponding QoS levels that are allocated to devices within the manufacturing lines. Example implementations enable optimal use of QoS communication resources without performance degradation of manufacturing applications caused by frequent change of QoS resource allocation.

Aspects of the present disclosure involve an innovative method for optimizing communication resource. The method may include substituting, by a processor, previous production line states associated with at least one production line to a default null state; and performing iteratively, by the processor: accessing production line information to obtain current production line state associated with the at least one production line; for each of the at least one production line: determining if previous production line state matches current production line state, for previous production line state not matching current production line state: accessing device information to retrieve IP address list of devices associated with production line, accessing quality of service (QOS) association information to retrieve QoS level for each of the devices, and creating pairings of IP address and QoS level in QoS configuration information for each device of the devices based on the IP address list and the QoS association information; for previous production line state of any of the at least one production line not matching associated current production line state: inputting QoS configuration information into a 5G network manager to allocate resources in a 5G communication network by configuring the 5G network based on the QoS configuration information; substituting the previous production line states with the current production line states; and resting by a predetermined period.

Aspects of the present disclosure involve an innovative non-transitory computer readable medium, storing instructions for optimizing communication resource. The instructions may include substituting, by a processor, previous production line states associated with at least one production line to a default null state; and performing iteratively, by the processor: accessing production line information to obtain current production line state associated with the at least one production line; for each of the at least one production line: determining if previous production line state matches current production line state, for previous production line state not matching current production line state: accessing device information to retrieve IP address list of devices associated with production line, accessing quality of service (QOS) association information to retrieve QoS level for each of the devices, and creating pairings of IP address and QoS level in QoS configuration information for each device of the devices based on the IP address list and the QoS association information; for previous production line state of any of the at least one production line not matching associated current production line state: inputting QoS configuration information into a 5G network manager to allocate resources in a 5G communication network by configuring the 5G network based on the QoS configuration information; substituting the previous production line states with the current production line states; and resting by a predetermined period.

Aspects of the present disclosure involve an innovative server system for optimizing communication resource. The system may include substituting, by a processor, previous production line states associated with at least one production line to a default null state; and performing iteratively, by the processor: accessing production line information to obtain current production line state associated with the at least one production line; for each of the at least one production line: determining if previous production line state matches current production line state, for previous production line state not matching current production line state: accessing device information to retrieve IP address list of devices associated with production line, accessing quality of service (QOS) association information to retrieve QoS level for each of the devices, and creating pairings of IP address and QoS level in QoS configuration information for each device of the devices based on the IP address list and the QoS association information; for previous production line state of any of the at least one production line not matching associated current production line state: inputting QoS configuration information into a 5G network manager to allocate resources in a 5G communication network by configuring the 5G network based on the QoS configuration information; substituting the previous production line states with the current production line states; and resting by a predetermined period.

Aspects of the present disclosure involve an innovative system for optimizing communication resource. The system may include means for substituting, by a processor, previous production line states associated with at least one production line to a default null state; and means for performing iteratively, by the processor: means for accessing production line information to obtain current production line state associated with the at least one production line; for each of the at least one production line: means for determining if previous production line state matches current production line state, for previous production line state not matching current production line state: means for accessing device information to retrieve IP address list of devices associated with production line, means for accessing quality of service (QOS) association information to retrieve QoS level for each of the devices, and creating pairings of IP address and QoS level in QoS configuration information for each device of the devices based on the IP address list and the QoS association information; for previous production line state of any of the at least one production line not matching associated current production line state: means for inputting QoS configuration information into a 5G network manager to allocate resources in a 5G communication network by configuring the 5G network based on the QoS configuration information; means for substituting the previous production line states with the current production line states; and means for resting by a predetermined period.

BRIEF DESCRIPTION OF DRAWINGS

A general architecture that implements the various features of the disclosure will now be described with reference to the drawings. The drawings and the associated descriptions are provided to illustrate example implementations of the disclosure and not to limit the scope of the disclosure. Throughout the drawings, reference numbers are reused to indicate correspondence between referenced elements.

DETAILED DESCRIPTION

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of the ordinary skills in the art practicing implementations of the present application. Selection can be conducted by a user through a user interface or other input means, or can be implemented through a desired algorithm. Example implementations as described herein can be utilized either singularly or in combination, and the functionality of the example implementations can be.

Figure 1:
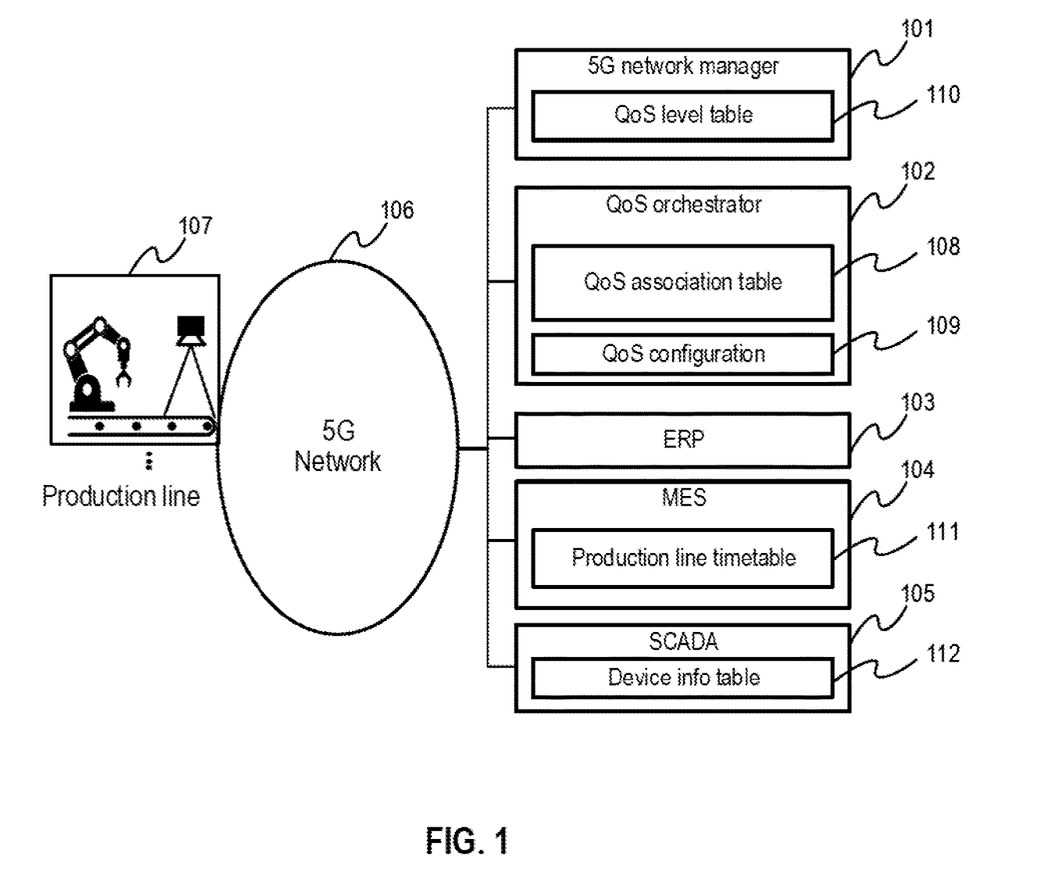
FIG. 1 illustrates an example system 100 for performing communication resource optimization, in accordance with an example implementation.

FIG. 1 illustrates an example system 100 for performing communication resource optimization, in accordance with an example implementation. The system 100 may include a 5G network manager 101, a QoS orchestrator 102, an ERP (Enterprise Resource Planning) 103, a MES (Manufacturing Execution System) 104, a SCADA (Supervisory Control and Data Acquisition) 105, a 5G network 106 and production lines 107. The ERP 103 is an integrated system that manages aspects of day-to-day production operation, and stores production planning information. The MES 104 optimizes the production process by monitoring, tracking, documenting, and controlling the entire production cycle. The MES 104 stores a production line timetable 111 created automatically or manually based on the production planning information. The SCADA 105 monitors and controls devices comprising production lines 107 and stores a device info table 112. Each production line 107 comprises a number of devices such as, but not limited to, belt conveyers, robotic arms, etc. The devices are connected to each other via the 5G network 106. The QoS orchestrator 102 comprises a QoS association table 108 and a QoS configurator 109. The Qos configurator 109 collects the production timetable 111 from the MES 104, creates QoS configuration and deploys the QoS configuration into the 5G network 106. The 5G network manager 101 configures the 5G network 106 based on the QoS configuration received from the QoS orchestrator 102 by referring to QoS level table 110.

Figure 2:
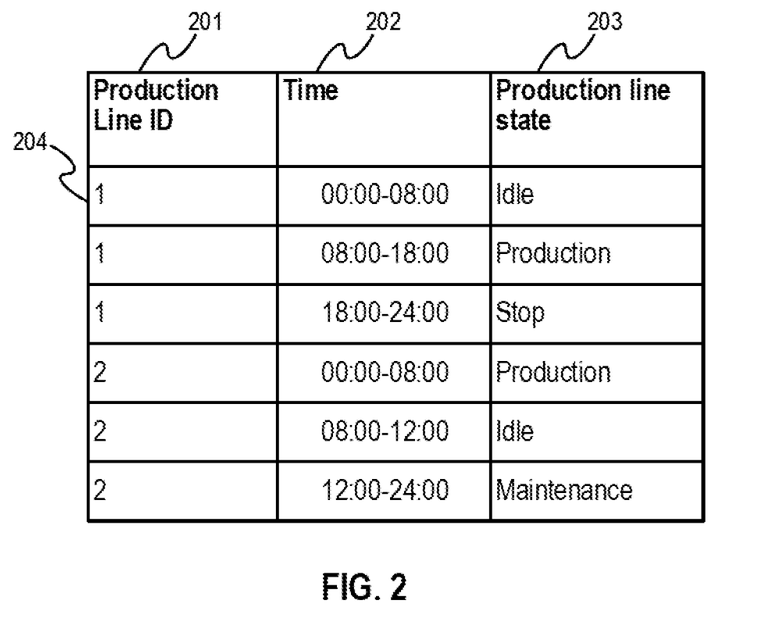
FIG. 2 illustrates an example production line timetable 111, in accordance with an example implementation.

FIG. 2 illustrates an example production line timetable 111, in accordance with an example implementation. As illustrated in FIG. 2, the production line timetable 111 may include information such as, but not limited to, production line ID 201, time 202, and production line state 203. Production line ID 201 is the identifier associated with the specific production line. Time 202 is a specific time period in which a production line state persists. Production line state 203 is a state of a production line. For example, row 204 shows a production line with a production line ID of "1" in idle state between the time period of 0:00 to 08:00.

Figure 3:
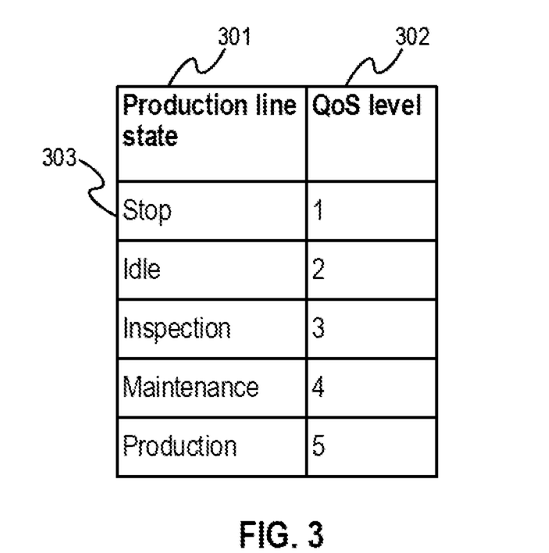
FIG. 3 illustrates an example QoS association table 108, in accordance with an example implementation.

FIG. 3 illustrates an example QoS association table 108, in accordance with an example implementation. As illustrated in FIG. 3, the QoS association table 108 may include information such as, but not limited to production line state 301 and QoS level 302. Production line state 301 in the QoS association table 108 corresponds with production line state 203 of the production line timetable 111. QoS level 302 is an indicator that shows the quality of guaranteed communication resource. The higher the QoS level, the higher the quality of guaranteed communication resource. For example, row 303 shows that a production line state of "Stop" being associated with the Qos level of "1".

Figure 4:
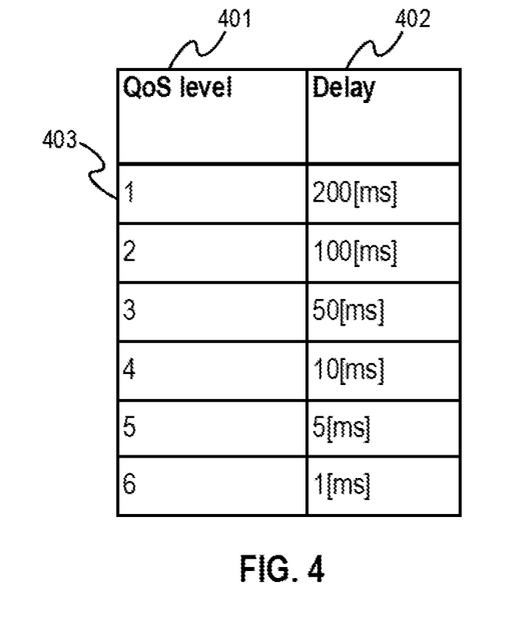
FIG. 4 illustrates an example QoS level table 110, in accordance with an example implementation.

FIG. 4 illustrates an example QoS level table 110, in accordance with an example implementation. As illustrated in FIG. 4, the QoS level table 110 may include information such as, but not limited to QoS level 401 and delay 402. QoS level 401 in the QoS level table 110 corresponds with QoS level 302 of the QoS association table 108. The delay 402 indicates guaranteed delay by QoS function in a 5G network. For example, the row 403 shows that QoS level "1" is associated with a delay of 200 ms.

Figure 5:
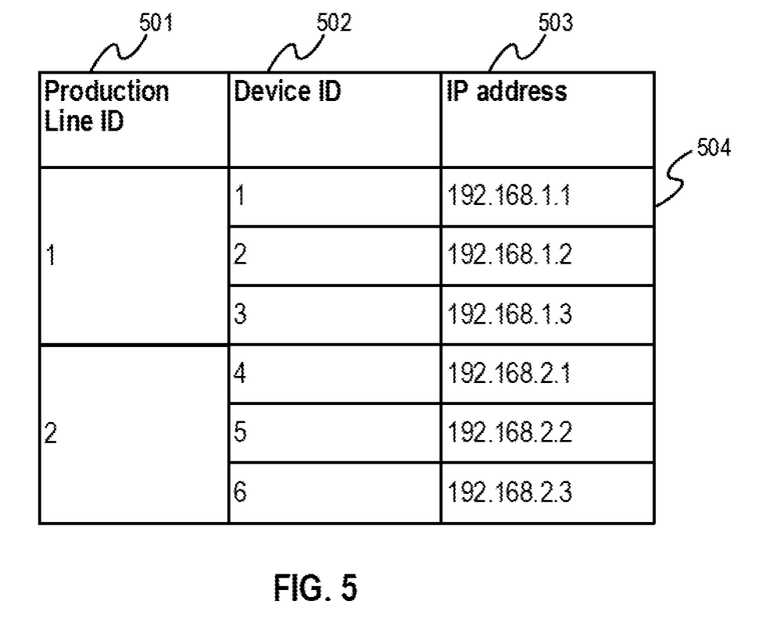
FIG. 5 illustrates an example device info table 112, in accordance with an example implementation.

FIG. 5 illustrates an example device info table 112, in accordance with an example implementation. As illustrated in FIG. 5, the device info table 112 may include information such as, but not limited to production line ID 501, device ID 502, and Internet Protocol (IP) address 503. Production line ID 501 corresponds with production line ID 201 of the production line timetable 111. Device ID 502 represents device associated with a production line. IP address 503 represents numeric identification value assigned to a device that is used for locating the device. The device info table 112 specifies devices associated with the various production lines, as well as the associated IP addresses. For example, the row 504 shows a device with an ID of "1" is a part of production line "1" and has an IP address of 192.168.1.1.

Figure 6:
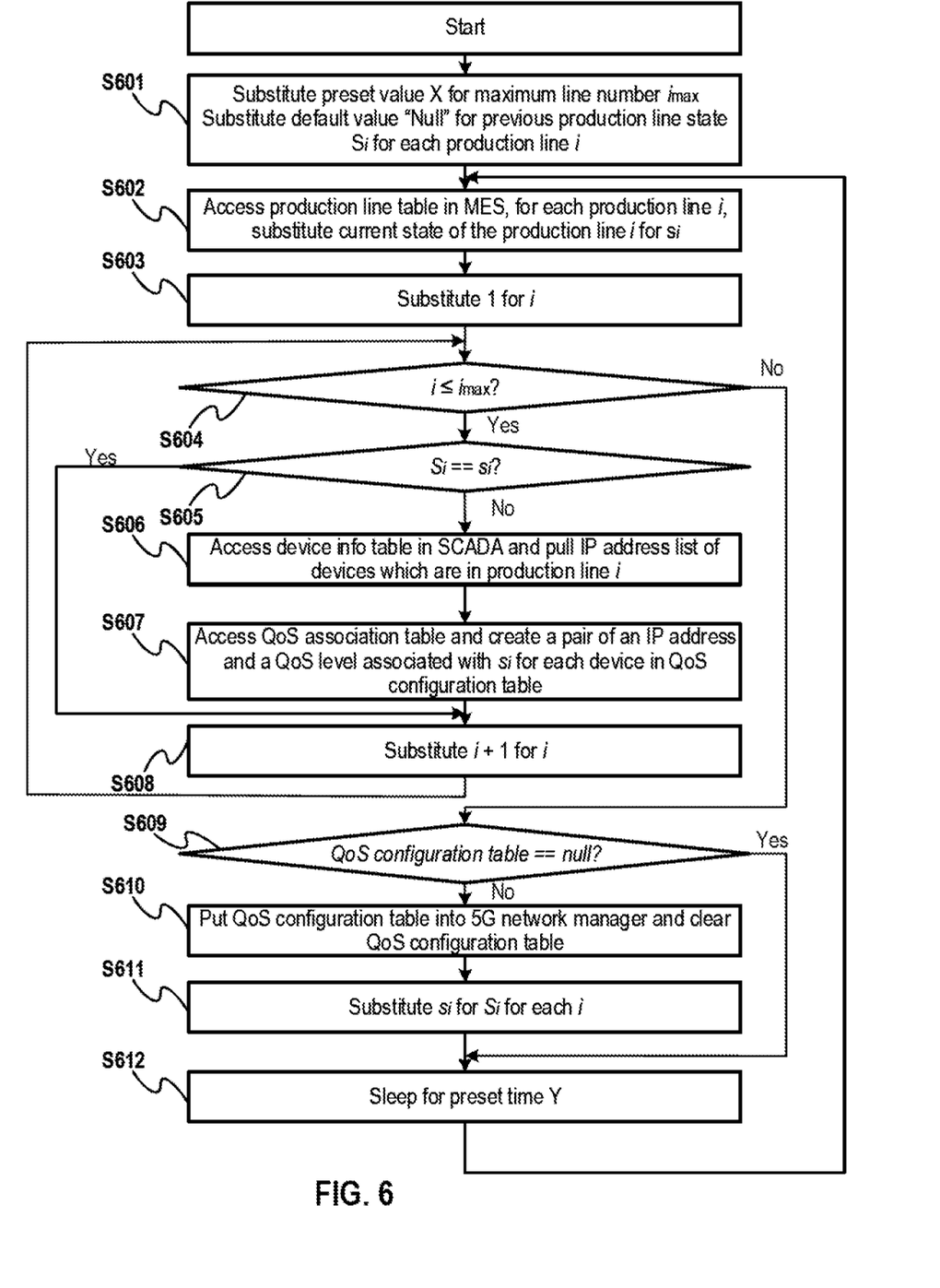
FIG. 6 illustrates an example process flow of QoS configurator 109, in accordance with an example implementation.

FIG. 6 illustrates an example process flow of QoS configurator 109, in accordance with an example implementation. The process begins at step S601, where the QoS configurator 109 substitutes preset value X for maximum line number imax and substitutes default value "Null" for previous production line state Si for each production line i. At step S602, the QoS configurator 109 accesses the production line timetable 111 stored in the MES 104, and for each production line i, the QoS configurator 109 substitutes the current state of the production line i for si.

At step S603, the value "1" is substituted for i. This is then followed by step S604, where a determination is made as to whether i is less than or equal to imax. If the result is yes, then the process continues to step S605. Otherwise, the process proceeds to step S609. At step S605, a determination is made as to whether Si is the same as si. If the result is yes, the process proceeds to step S608. Otherwise, the process continues to step S606, where the QoS configurator 109 accesses the device info table in the SCADA 105 and pulls IP address list of devices which are in the production line i.

At step S607, the QoS configurator 109 accesses the QoS association table 108 and performs pairing of IP address and QoS level associated with si for each device, and stores the generated information pairs into the QoS configuration table. If Si is the same as si at step S605, then the associated entry in the QoS configuration table is null. At step S608, the QoS configurator 109 substitutes i+1 for i, and the process continues to step S609, where the QoS configurator 109 checks if the QoS configuration table is null or not. If the result is yes, it follows step S612. Otherwise, the process continues to step S610.

At step S610, the QoS configurator 109 puts the QoS configuration table into the 5G network manager and clears the QoS configuration table on completion of the step. At step S611, the QoS configurator 109 substitutes si for Si for each i, and the process continues to step S612, where the QoS configurator 109 sleeps/rests for a preset time Y, and the process returns to step S602 to begin subsequent iterations.

The following describes detailed flow of the QoS configurator 109 with a specific example to which the production line timetable 111 of FIG. 2, the device info table 112 of FIG. 5, and the QoS association table 108 of FIG. 3 are used. It is assumed that the current time is 0:00, X is 2, and a preset time Y is 1 min.

At step S601, the QoS configurator 109 substitutes preset value of 2 for maximum line number imax and substitutes the default value "Null" for previous production line state Si for each production line i. At step S602, the QoS configurator 109 accesses the production line timetable 111 in the MES 104, and for each production line i, it substitutes the current state of the production line i for si. According to the production line timetable 111, the current states of line 1 and 2 at 0:00 are "idle" and "production" respectively. Therefore, s1 and s2 are set to "idle" and "production" respectively.

At step S603, the QoS configurator 109 substitutes 1 for i. This is then followed by step S604, where the QoS configurator 109 checks if i (=1) is less than or equal to imax (=2). The result yields yes, which takes the process to step S605, where the QoS configurator 109 determines whether Si (=1) (=null) is the same as si (=1) (=idle). The result yields no, so the process proceeds to step S606.

At step S606, the QoS configurator 109 accesses the device info table 112 stored in SCADA 105 and pulls IP address list of devices which are in the production line i (=1). According to the device info table 112, the devices in production line 1 have IP addresses of 192.168.1.1, 192, 168.1.2 and 192.168.1.3.

At step S607, the QoS configurator 109 accesses the QoS association table 108 and performs pairing of IP address and QoS level associated with si (=1) (=idle) for each device, and stores the generated information pairs into the QoS configuration table. Here, the QoS level associated with idle is "2". Therefore, pairs [[192.168.1.1, 2], [192.168.1.2, 2], [192.168.1.3, 2]] are added to the QoS configuration table.

At step S608, the QoS configurator 109 substitutes i+1 for i, and the process returns to step S604 again, with i updated to "2". At step S604, the QoS configurator 109 checks if i (=2) is less than or equal to imax (=2). If the result is yes, the process continues to step S605. Otherwise, the process proceeds to step S609.

At step S605, the QoS configurator 109 checks if Si (=2) (=null) is the same as si (=2) (=production). The result is no, so the process continues to step S606, where the QoS configurator 109 accesses the device info table 112 and pulls IP address list of devices which are in the production line i (=2). According to the device info table 112, the devices in the production line 2 have IP addresses of 192.168.2.1, 192, 168.2.2 and 192.168.2.3.

At step S607, the QoS configurator 109 accesses the QoS association table 108 and performs pairing of IP address and QoS level associated with si (=2) (=production) for each device, and stores the generated information pairs into the QoS configuration table. Here. The QoS level associated with production is "5". Therefore, pairs [[192.168.2.1, 5], [192.168.2.2, 5], [192.168.2.3, 5]] are added to the QoS configuration table.

At step S608, the QoS configurator 109 substitutes i (=2)+1 for i, and the process returns again to step S604, with i updated to "3". At step S604, the QoS configurator 109 checks if i (=3) is less than or equal to imax (=2). The result is no, so the process proceeds to step S609. At step S609, the QoS configurator 109 determines whether the QoS configuration table is null or not. The result is no, thus the process continues to step S610.

At step S610, the QoS configurator 109 puts the QoS configuration table into the 5G network manager 101. The QoS configuration table includes the entries [[192.168.1.1, 2], [192.168.1.2, 2], [192.168.1.3, 2], [192.168.2.1,5], [192.168.2.2, 5], [192.168.2.3, 5]], which were created in step S607. On completion of step S610, the QoS configurator then clears the Qos configuration table.

At step S611, the QoS configurator 109 substitutes si for Si for each i. The process then continues to step S612, where the QoS configurator 109 sleeps/rests for a preset time Y (=1 min), and the process returns to step S602. At this point in time, the current time is 0:01.

At step S602, the QoS configurator 109 accesses the production line timetable 111 in the MES 104 and for each production line i, it substitutes the current state of the production line i for si. According to the production line time, the current state of line 1 and 2 at 0:01 are "idle" and "production" respectively. Therefore, s1 and s2 are "idle" and "production" respectively.

At step S603, the QoS configurator 109 substitutes 1 for i. At step S604, the QoS configurator 109 determines if i (=1) is less than or equal to imax (=2). The yielded result is yes, so the process continues to step S605. At step S605, the QoS configurator 109 determines if Si (=1) (=idle) is the same as si (=1) (=idle). The result is yes, thus the process proceeds to step S608.

At step S608, the QoS configurator 109 substitutes i (=1)+1 for i, then the process proceeds to step S604, with i updated to "2". At step S604, the QoS configurator 109 determines whether i (=2) is less than or equal to imax (=2). Given that i equals to imax, the process continues to step S605.

At step S605, the QoS configurator 109 determines whether Si (=2) (=production) is the same as si (=2) (=production). The result is yes, so the process continues to step S608, where the QoS configurator 109 substitutes i (=1)+1 for i, and the process continues to step S604 again, with i updated to "3".

At step S604, the QoS configurator 109 determines whether i (=3) is less than or equal to imax (=2). The result is no, so the process continues to step S609, where the QoS configurator 109 determines whether the QoS configuration table is null or not. The result is yes, so the process continues to step S612.

At step S612, the QoS configurator 109 sleeps/rests for a preset time Y (=1 min), and the process returns to step S602 again. Here, the current time is 0:02, and the process continues in iterations as illustrated in FIG. 6. Based on the foregoing, optimal use of communication QoS resources can therefore be achieved without frequent change of QoS allocation which can cause degradation of manufacturing application performance.

Mismatch between actual state of a production line and scheduled state of the production line may occur when the production line timetable 111 is not updated frequently. Mismatch can arise from unexpected issues causing delay in production. Even if the state of a production line in the timetable 111 in MES 104 is idle, the actual state of the production line may be in the "production" state due to delay of prior production. This leads to mismatch between a required QoS level from the production line and QoS level allocated to the production line, which can cause degradation of production. QoS resources allocation addressing mismatch between the state of a production line in the production line timetable 111 and the actual state of the production is described in details below.

Figure 7:
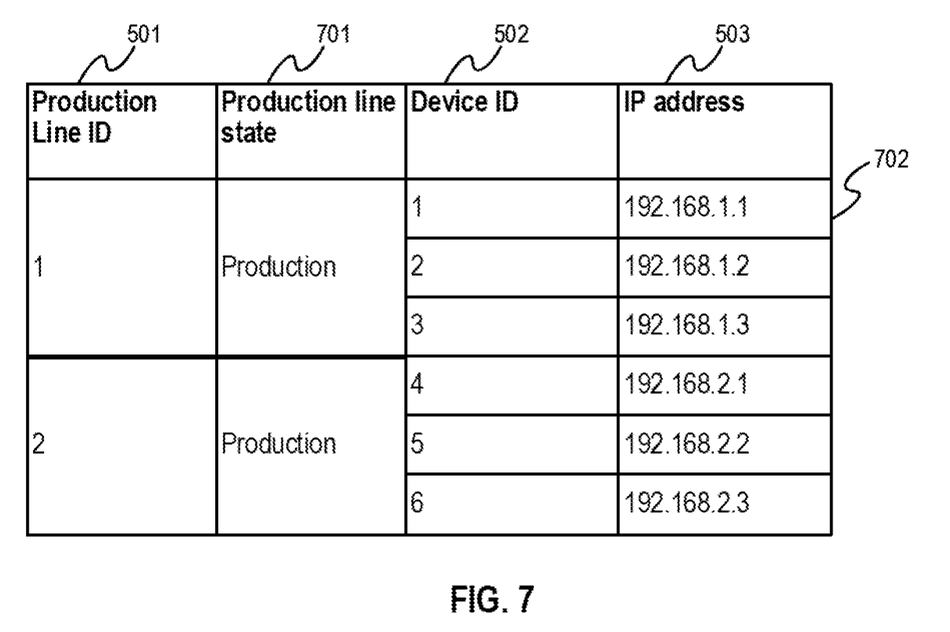
FIG. 7 illustrates an alternate example device info table 112, in accordance with an example implementation.

FIG. 7 illustrates an alternate example device info table 112, in accordance with an example implementation. In contrast from FIG. 5, the device info table 112 of FIG. 7 may include additional information, such as, but not limited to, production lines state 701 collected from the field devices. This state is frequently updated and reflects the actual state of a production line.

Figure 8:
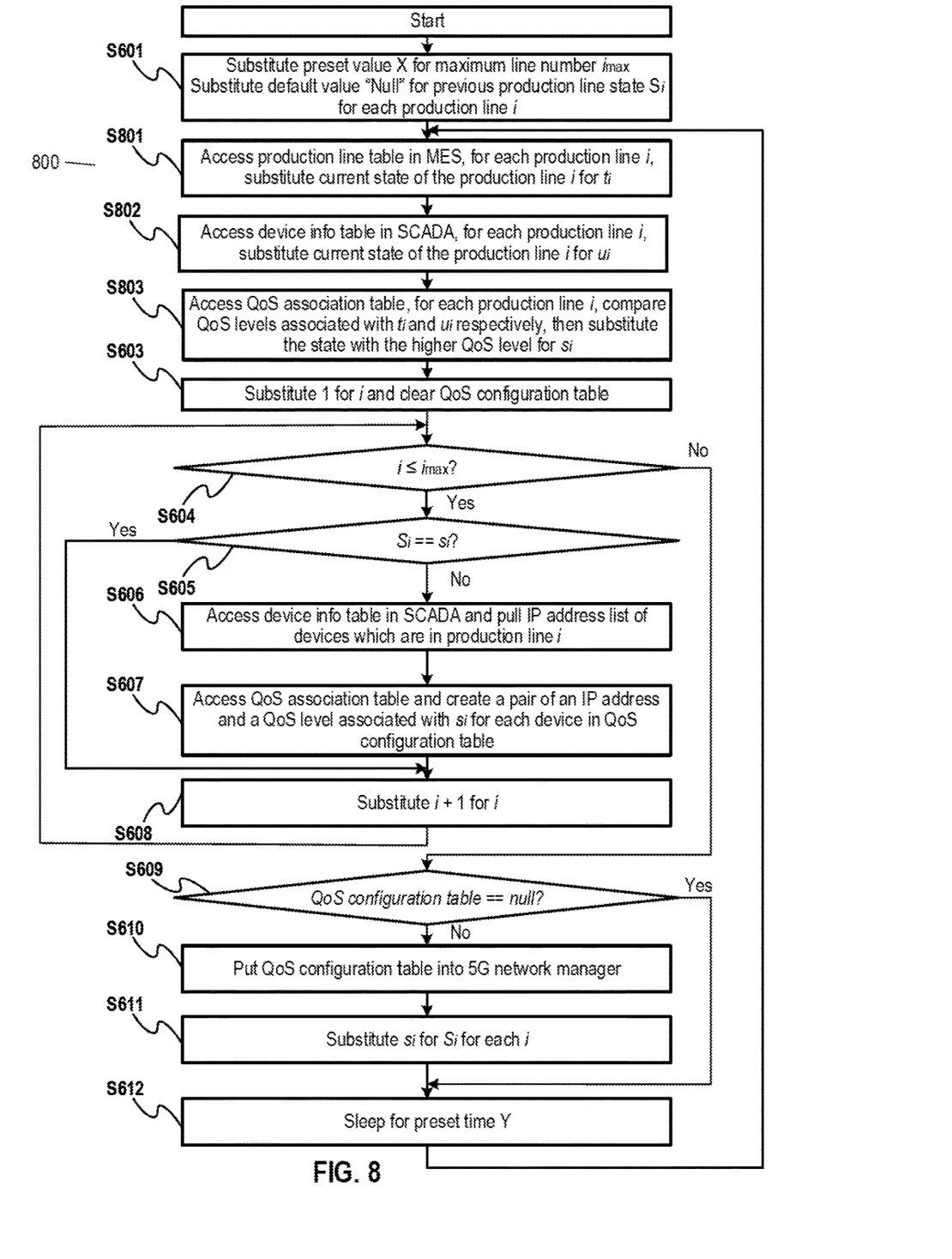
FIG. 8 illustrates an alternate example process flow 800 of the QoS configurator 109, in accordance with an example implementation.

FIG. 8 illustrates an alternate example process flow 800 of the QoS configurator 109, in accordance with an example implementation. In contrast from FIG. 6, the process flow 800 includes the additional steps of S801-S803. At step S801, the QoS configurator 109 accesses the production line timetable 111 in the MES 104 and for each production line i, it substitutes the current state of the production line i for ti. At step S802, the QoS configurator 109 accesses the device info table 112, as shown in FIG. 7, stored in the SCADA 105, and for each production line i, it substitutes the current state of the production line i for ui. At step S803, the QoS configurator 109 accesses the QoS association table 108 and for each production line i, it compares QoS levels associated with ti and ui respectively, and substitutes the state with higher QoS level for si.

The following example provides a detailed flow of the QoS configurator 109 where the production line timetable 111 of FIG. 2, the device info table 112 of FIG. 7, and the QoS association table 108 of FIG. 3 are used. It is assumed that the current time is 08:01, X is 2, both S1, S2 are 'production' and a preset time Y is 1 min.

At step S801, the QoS configurator 109 accesses the production line timetable 111 stored in the MES 104, and for each production line i, it substitutes the current state of the production line i for ti. According to the production line timetable 111, the current state of line 1 and 2 at 08:01 are "idle" and "production" respectively. Therefore, t1 and t2 are "idle" and "production" respectively.

At step S802, the QoS configurator 109 accesses the device info table 112 stored in the SCADA 105, and for each production line i, it substitutes the current state of the production line i for ui. According to the device info table 112, the current states of lines are both "production". Therefore, u1 and u2 are set to "production".

At step S803, the QoS configurator 109 accesses the QoS association table 108, and for each production line i, it compares QoS levels associated with ti and ui respectively, then substitutes the state with higher QoS level for si. Here, the QoS levels for t1, t2, u1, and u2 are 2, 5, 5, 5 respectively. When the QoS levels for t1 and u1 are compared, the QoS level for u1 is higher than that of t1. When the QoS levels for l2 and 2 are compared, they are the same. Therefore, s s1 and s2 are both set to "production". After the QoS configurator 109 goes through step S603 to S610, it puts the QoS configuration table into the 5G network manager 101. Here, the QoS configuration table includes pairings of [[192.168.1.1, 5], [192.168.1.2, 5], [192.168.1.3, 5]]. In the example, QoS level of "5" continues to be allocated to the devices in production line 2 even though QoS level "2" is supposed to be allocated to the devices based on the production line state of "idle". As shown in the example, optimal QoS resources allocation is enabled even when there is a mismatch between the state of a production line in the production line timetable 111 and the actual state of the production line.

Low QOS affects the performance of production and can be a cause of delayed production. To address the problem, an alternate production line timetable 111 including production progress is used. The alternate production line timetable 111 is described in details below.

Figure 9:
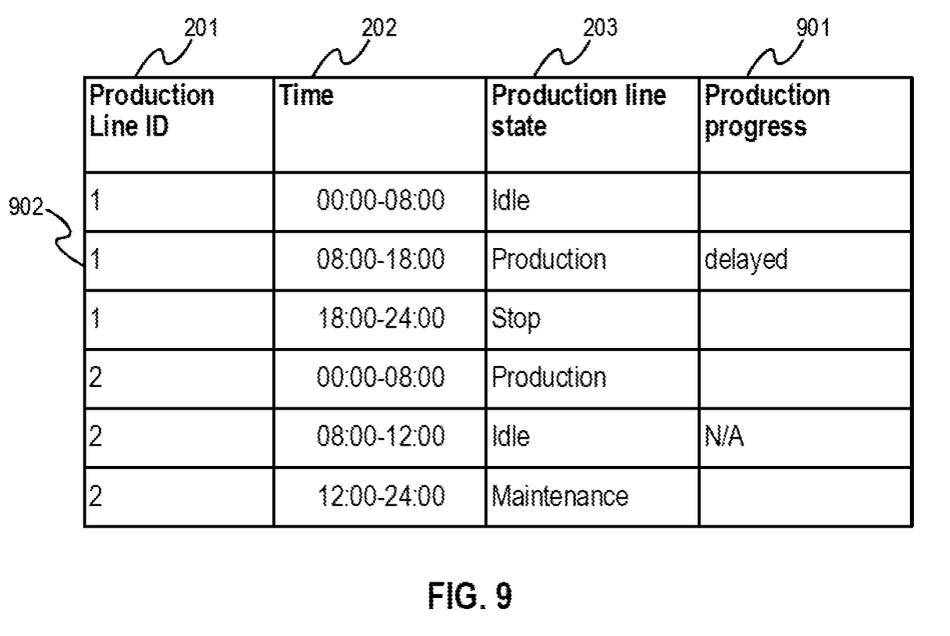
FIG. 9 illustrates an alternate example of the production line timetable 111, in accordance with an example implementation.

FIG. 9 illustrates an alternate example of the production line timetable 111, in accordance with an example implementation. As illustrated in FIG. 9, the production line timetable 111 includes the additional column of production progress 901. The production progress 901 represents the production progress associated with a production line. Specifically, the production progress 901 indicates whether the production progress is on-schedule or delayed. The production progress 901 is updated manually or automatically by SCADA 105 or another system when the associated production line is in the state of production. When the QoS configurator 109 determines a QoS level to a production line, it refers to not only the production line state 203 but also to the production progress 901 when the production line state is production.

If the production line state 203 is production and the progress of the production line is delayed, a higher level QoS is allocated to the production line. Using row 902 as example, it is assumed that the current time is 13:00, the production line state is "production" and the production progress of the line is "delayed" as shown in FIG. 9. According to the QoS association table 108 shown in FIG. 3, the QoS level associated with production is 5. The production progress of the line is delayed, so a higher QoS level 6 is allocated to the devices comprising production line 1. Allocating a higher level QoS allocation contributes to avoiding further delay of the production line caused by low communication quality.

The foregoing example implementation may have various benefits and advantages. For example, use of communication QoS resources is optimized without frequent changes in QoS allocation which can cause degradation of manufacturing application performance. Through use of the communication resource optimization system, delay in production caused by low communication quality is minimized. In addition, optimal QoS resource allocation is achieved even when mismatch occurs between the state of a production line in the production line timetable in MES and the actual state of the production line.

Figure 10:
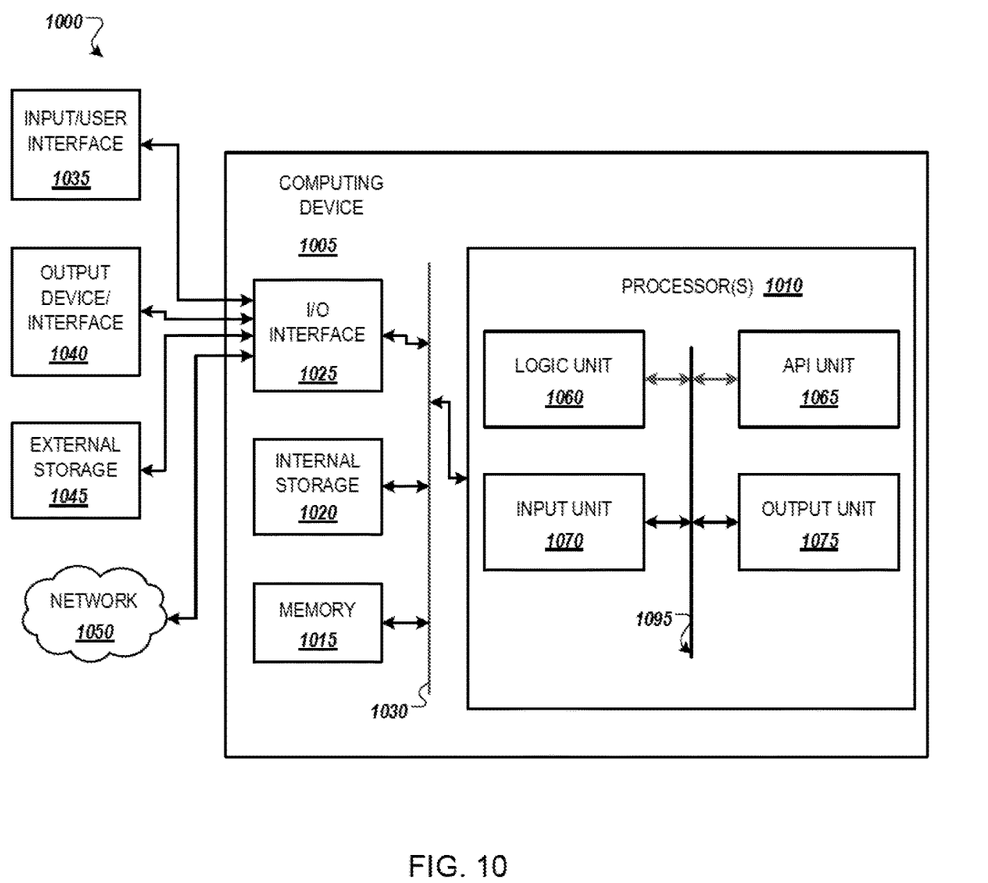
FIG. 10 illustrates an example computing environment with an example computing device suitable for use in some example implementations.

FIG. 10 illustrates an example computing environment with an example computing device suitable for use in some example implementations. Computing device 1005 in computing environment 1000 can include one or more processing units, cores, or processor(s) 1010, memory 1015 (e.g., RAM, ROM, and/or the like), internal storage 1020 (e.g., magnetic, optical, solid-state storage, and/or organic), and/or I/O interface 1025, any of which can be coupled on a communication mechanism or bus 1030 for communicating information or embedded in the computing device 1005. I/O interface 1025 is also configured to receive images from cameras or provide images to projectors or displays, depending on the desired implementation.

Computing device 1005 can be communicatively coupled to input/user interface 1035 and output device/interface 1040. Either one or both of the input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, accelerometer, optical reader, and/or the like). Output device/interface 1040 may include a display, television, monitor, printer, speaker, braille, or the like. In some example implementations, input/user interface 1035 and output device/interface 1040 can be embedded with or physically coupled to the computing device 1005. In other example implementations, other computing devices may function as or provide the functions of input/user interface 1035 and output device/interface 1040 for a computing device 1005.

Examples of computing device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 1005 can be communicatively coupled (e.g., via I/O interface 1025) to external storage 1045 and network 1050 for communicating with any number of networked components, devices, and systems, including one or more computing devices of the same or different configuration. Computing device 1005 or any connected computing device can be functioning as, providing services of, or referred to as, a server, client, thin server, general machine, special-purpose machine, or another label.

I/O interface 1025 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, satellite network, and the like).

Computing device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computing device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of hardware processors such as central processing units (CPUs) or in a combination of hardware and software units.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, the input unit 1070, and the output unit 1075 in some example implementations described above. For example, the flow of one or more processes or implementations may be controlled by logic unit 1060 alone or in conjunction with API unit 1065. The input unit 1070 may be configured to obtain input for the calculations described in the example implementations, and the output unit 1075 may be configured to provide an output based on the calculations described in example implementations.

Processor(s) 1010 can be configured to substitute previous production line states associated with at least one production line to a default null state as shown in FIG. 6. The processor (s) 1010 access production line information to obtain current production line state associated with the at least one production line as shown in FIG. 6. The processor(s) 1010 determine if previous production line state matches current production line state as shown in FIG. 6. The processor(s) 1010 access device information to retrieve IP address list of devices associated with production line as shown in FIG. 6. The processor(s) 1010 access quality of service (Qos) association information to retrieve QoS level for each of the devices as shown in FIG. 6. The processor(s) 1010 create pairings of IP address and QoS level in QoS configuration information for each device of the devices based on the IP address list and the QoS association information as shown in FIG. 6. The processor(s) 1010 input QoS configuration information into a 5G network manager to allocate resources in a 5G communication network by configuring the 5G network based on the QoS configuration information as shown in FIG. 6. The processor(s) 1010 substitute the previous production line states with the current production line states. The processor(s) 1010 rest by a predetermined period as shown in FIG. 6.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer readable storage medium or a computer readable signal medium. A computer readable storage medium may involve tangible mediums such as, but not limited to, optical disks, magnetic disks, read-only memories, random access memories, solid-state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer readable medium. If desired, the instructions can be stored in the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for optimizing communication resource, the method comprising:
  substituting, by a processor, previous production line states associated with at least one production line to a default null state; and
  performing iteratively, by the processor:
    accessing production line information to obtain current production line state associated with the at least one production line;
    for each of the at least one production line:
      determining if previous production line state matches current production line state,
      for previous production line state not matching current production line state:
        accessing device information to retrieve IP address list of devices associated with production line,
        accessing quality of service (Qos) association information to retrieve QoS level for each of the devices, and
        creating pairings of IP address and QoS level in QoS configuration information for each device of the devices based on the IP address list and the QoS association information;

for previous production line state of any of the at least one production line not matching associated current production line state:
inputting QoS configuration information into a SO network manager to allocate resources in a 5G communication network by configuring the 5G network based on the QoS configuration information;
substituting the previous production line states with the current production line states; and
resting by a predetermined period.

2. The method of claim 1, further comprising:
for the previous production line states matching the current production line states:
resting by the predetermined period.

3. The method of claim 1, wherein accessing production line information to obtain current production line state associated with the at least one production line comprises:
accessing, for each of the at least one production line, first production line state from the production line information;
accessing, for each of the at least one production line, second production line state from the device information;
accessing, for each of the at least one production line, QoS levels associated with the first production line state and the second production line state from the QoS association information; and
setting, for each of the at least one production line, a production line state with higher Qos level from the first production line state and the second production line state as current production line state.

4. The method of claim 1, wherein accessing quality of service (Qos) association information to retrieve QoS level for each of the devices comprises:
accessing the production line information to determine production progress of production line;
accessing the QoS association information to retrieve QoS level for each of the devices associated with production line; and
for production progress having a delayed state, allocating a QoS level higher than the retrieved QoS level for each of the devices associated with production line.

5. The method of claim 1,
wherein the production line information is stored in a manufacturing execution system (MES), the device information is stored in a supervisory control and data acquisition (SCADA) system, and the QoS association information is stored in a QoS orchestrator.

6. A system for optimizing communication resource, the system comprising:
a network;
a network manager in communication with the network, the network manager comprises a processor for configuring the network;
a manufacturing execution system (MES), wherein the MES stores production line information associated with at least one production line, the production line information comprises current production line state associated with the at least one production line;
a supervisory control and data acquisition (SCADA) system, wherein the SCADA system stores device information associated with the at least one production line, the device information comprises IP address list of devices associated with the at least one production line;

a quality of service (Qos) orchestrator, wherein the QoS orchestrator stores Qos association information for each of the devices associated with the at least one production line; and
wherein the processor configures the network using the production line information, the device information, and the QoS association information, and is configured to:
substitute previous production line states associated with at least one production line to a default null state; and
perform iteratively:
access production line information to obtain current production line state associated with the at least one production line;
for each of the at least one production line:
determine if previous production line state matches current production line state,
for previous production line state not matching current production line state:
access device information to retrieve IP address list of devices associated with production line;
access quality of service (QoS) association information to retrieve QoS level for each of the devices, and
create pairings of IP address and QoS level in QoS configuration information for each device of the devices based on the IP address list and the QoS association information:
for previous production line state of any of the at least one production line not matching associated current production line state:
input QoS configuration information into a SO network manager to allocate resources in a SG communication network by configuring the SC network based on the QoS configuration information;
substitute the previous production line states with the current production line states; and
rest by a predetermined period.

7. The system of claim 6, further comprising
for the previous production line states matching the current production line states:
rest the processor by the predetermined period.

8. The system of claim 6, wherein accesses production line information to obtain current production line state associated with the at least one production line comprises:
accesses, for each of the at least one production line, first production line state from the production line information;
accesses, for each of the at least one production line, second production line state from the device information:
accesses, for each of the at least one production line, QoS levels associated with the first production line state and the second production line state from the QoS association information; and
sets, for each of the at least one production line, a production line state with higher Qos level from the first production line state and the second production line state as current production line state.

9. The system of claim 6, wherein accesses quality of service (Qos) association information to retrieve QoS level for each of the devices comprises:
accesses the production line information to determine production progress of production line;
accesses the QoS association information to retrieve QoS level for each of the devices associated with production line; and for production progress having a delayed state, allocates a QoS level higher than the retrieved QoS level for each of the devices associated with production line.

\* \* \* \* \*